US012291019B2

(12) United States Patent
Tomioka et al.

(10) Patent No.: US 12,291,019 B2
(45) Date of Patent: May 6, 2025

(54) DRYING DEVICE AND RECORDING DEVICE

(71) Applicant: SEIKO EPSON CORPORATION, Tokyo (JP)

(72) Inventors: Hiroto Tomioka, Shiojiri (JP); Tadashi Aizawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 148 days.

(21) Appl. No.: 17/823,332

(22) Filed: Aug. 30, 2022

(65) Prior Publication Data

US 2023/0066326 A1 Mar. 2, 2023

(30) Foreign Application Priority Data

Aug. 31, 2021 (JP) ................................ 2021-140969

(51) Int. Cl.

| | |
|---|---|
| ***B41J 11/00*** | (2006.01) |
| ***H05B 6/54*** | (2006.01) |
| ***H05B 6/62*** | (2006.01) |

(52) U.S. Cl.

CPC .............. *B41J 11/002* (2013.01); *H05B 6/54* (2013.01); *H05B 6/62* (2013.01)

(58) Field of Classification Search

CPC ................ B41J 11/002; B41J 11/00216; B41J 11/00212; B41J 11/0021; B41J 11/00218; B41J 11/0015; H05B 6/62; H05B 6/54

See application file for complete search history.

(56) References Cited

U.S. PATENT DOCUMENTS

| | | | | |
|---|---|---|---|---|
| 10,232,641 | B2 | 3/2019 | Yamada | |
| 11,351,806 | B2 | 6/2022 | Aizawa | |
| 11,660,900 | B2 | 5/2023 | Aizawa | |
| 2003/0199251 | A1 | 10/2003 | Gorbold | |
| 2017/0266986 | A1 * | 9/2017 | Yamada | B41J 11/00216 |
| 2020/0406659 | A1 | 12/2020 | Aizawa | |
| 2022/0258516 | A1 | 8/2022 | Aizawa | |

FOREIGN PATENT DOCUMENTS

| | | |
|---|---|---|
| JP | 2017-016742 A | 1/2017 |
| JP | 2017-165000 | 9/2017 |
| JP | 2021-008969 | 1/2021 |

* cited by examiner

*Primary Examiner* — Jannelle M Lebron
(74) *Attorney, Agent, or Firm* — WORKMAN NYDEGGER

(57) ABSTRACT

According to an aspect of the present disclosure, there is provided a drying device disposed at a predetermined interval from a recording medium and including a heater configured to dry liquid applied to the recording medium with a high frequency wave. The heater includes a first electrode coupled to a power supply that outputs the high frequency wave and a second electrode coupled to the power supply that outputs the high frequency wave and disposed to be separated from the first electrode at a predetermined interval. The distance between the end of the first electrode and the recording medium is longer compared with the distance between the center of the first electrode and the recording medium.

6 Claims, 9 Drawing Sheets

DRYING DEVICE AND RECORDING DEVICE

The present application is based on, and claims priority from JP Application Serial Number 2021-140969, filed Aug. 31, 2021, the disclosure of which is hereby incorporated by reference herein in its entirety.

BACKGROUND

1. Technical Field

The present disclosure relates to a drying device and a recording device.

2. Related Art

Various kinds of recording devices have been developed. Not only the recording devices but also components included in the recording devices have been variously examined. For example, a mechanism for quickly drying ink adhering to a recording medium has been examined.

For example, JP-A-2017-016742 (Patent Literature 1) discloses a high-frequency dielectric heating device that applies an alternating electric field to a medium and dielectrically heats ink adhering to the medium to dry the ink. In the device disclosed in Patent Literature 1, a hole is formed in one of a pair of electrodes to which a high frequency wave is input and the other electrode is disposed in the hole. Consequently, it is possible to perform isotropic heating and perform uniform drying irrespective of a printing pattern.

However, in general, when a high frequency wave is generated, a generated electromagnetic field has a nonuniform intensity distribution and a distribution occurs in the intensity of dielectric heating as well. For example, in the high-frequency induction heating device described in Patent Literature 1, inherent unevenness occurs in an electromagnetic field generated by the two electrodes. Uniform heating cannot be always sufficiently performed. Therefore, there has been a demand for a drying device that can more uniformly heat liquid adhering to a recording medium.

SUMMARY

A drying device according to an aspect of the present disclosure is a drying device disposed at a predetermined interval from a recording medium and including a heater configured to dry liquid applied to the recording medium with a high frequency wave. The heater includes: a first electrode coupled to a power supply that outputs the high frequency wave; and a second electrode coupled to the power supply that outputs the high frequency wave and disposed to be separated from the first electrode at a predetermined interval. A distance between an end of the first electrode and the recording medium is longer compared with a distance between a center of the first electrode and the recording medium.

A recording device according to an aspect of the present disclosure includes a plurality of the drying devices. All of the plurality of drying devices are disposed to be separated from the recording medium at the predetermined interval.

DESCRIPTION OF EXEMPLARY EMBODIMENTS

An embodiment of the present disclosure is explained below. The embodiment explained below explains an example of the present disclosure. The present disclosure is not limited by the embodiment explained below and includes various modifications implemented in a range in which the gist of the present disclosure is not changed. Not all of components explained below are essential components of the present disclosure.

1. Drying Device

A drying device according to this embodiment is a drying device disposed at a predetermined interval from a recording medium and including a heater that dries liquid applied to the recording medium with a high frequency wave. The heater includes a first electrode coupled to a power supply that outputs the high frequency wave and a second electrode coupled to the power supply that outputs the high frequency wave and disposed to be separated from the first electrode at a predetermined interval. The distance between the end of the first electrode and the recording medium is longer compared with the distance between the center of the first electrode and the recording medium. The members are sequentially explained below with reference to the drawings.

The drying device according to this embodiment includes the heater. The drying device according to this embodiment includes a not-shown high-frequency power supply. The high-frequency power supply includes a high-frequency voltage generation circuit. The high-frequency power supply generates a high-frequency voltage applied to the heater. The high-frequency power supply is configured by, for example, a crystal oscillator, a PLL (Phase Locked Loop) circuit, and a power amplifier. The high-frequency voltage generated by the high-frequency power supply is supplied to the heater via a resonance circuit and a coaxial cable. A basic peripheral circuit configuration of the high-frequency power supply of the drying device according to this embodiment is a configuration for amplifying, with the power amplifier, a high-frequency signal generated by the PLL circuit and supplying the high-frequency signal to the heater.

1.1. Heater (First Embodiment)

Figure 1:
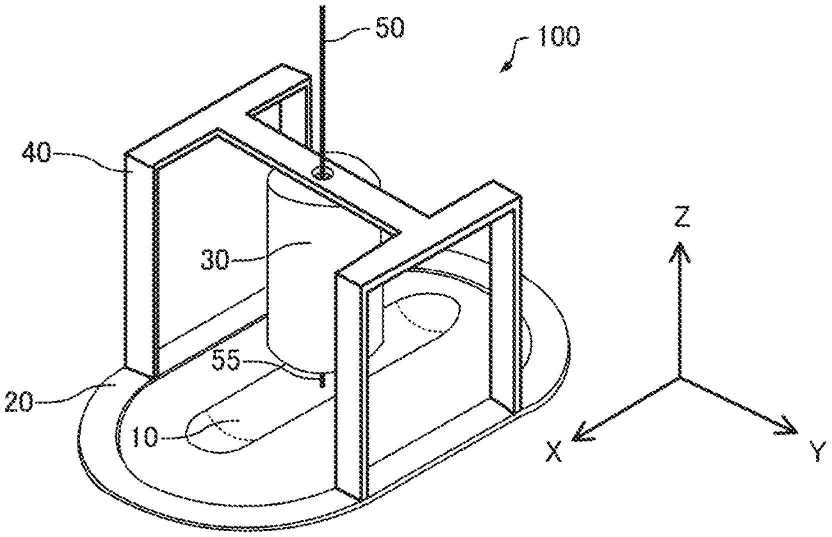
FIG. 1 is a perspective view schematically showing a heater according to a first embodiment.

FIG. 1 is a schematic diagram of a heater 100 of a drying device according to a first embodiment. The drying device according to the first embodiment includes the heater 100. The heater 100 includes a first electrode 10, a second electrode 20, and a coil 30. One end of the coil 30 is electrically coupled to the first electrode 10. The other end of the coil 30 is electrically coupled to the high-frequency power supply. In an example shown in FIG. 1, the other end of the coil 30 is electrically coupled to the high-frequency power supply by an internal conductor 50 of the coaxial cable. For example, the second electrode 20 is electrically coupled to the high-frequency power supply by an external conductor (not shown) of the coaxial cable.

1.1.1. First Electrode and Second Electrode

The first electrode 10 and the second electrode 20 are conductors. The first electrode 10 and the second electrode 20 configure a capacitor. One of potentials applied to the first electrode 10 and the second electrode 20 may be reference potential. In this case, the other of the potentials applied to the first electrode 10 and the second electrode 20 is a high-frequency voltage. In this specification, an electrode to which the reference potential is applied is sometimes referred to as "reference potential electrode" and an electrode to which the high-frequency voltage is applied is sometimes referred to as "high-frequency electrode". The reference potential is constant potential serving as a reference of the high-frequency voltage and may be, for example, ground potential.

If a frequency of the high-frequency voltage is 1 MHz or higher, an effect of heating an object to be heated is obtained. However, when the object to be heated is water, the frequency of the high-frequency voltage has a largest dielectric loss tangent near 20 GHz. Therefore, heating efficiency due to the dielectric loss tangent is also the largest. On the other hand, from the viewpoint of heating ink, even if the frequency is as low as 40.68 MHz, which is one of ISM bands, satisfactory heating efficiency can be obtained. This is because, although the dielectric loss tangent of the water in the ink is extremely low at 40.68 MHz, large heat generation is obtained by a resistance loss due to an eddy current flowing to electric resistance of the liquid on the recording medium.

A heat quantity supplied to the liquid is larger as the high-frequency voltage is higher. However, since the high-frequency voltage is usually transmitted to the heater 100 by a transmission line having 50Ω, the high-frequency voltage changes to a voltage represented by "high-frequency power=V^2/R=V^2/50" in a high-frequency voltage input of the heater 100.

Further, to reduce a heat quantity generated in parasitic resistance of the heater 100 and prevent corona discharge from occurring, the drying device preferably includes a plurality of heaters 100 having electric power of approximately several hundred watts. Consequently, the drying device can obtain, while securing electric power necessary for drying the liquid, an effect of reducing the heat quantity generated in the parasitic resistance of the heater 100 and an effect of preventing corona discharge from occurring. The liquid is heated by an electric field generated between the first electrode 10 and the second electrode 20. The electric field generated between the first electrode 10 and the second electrode 20 has an extremely large value of approximately 1×10^6 V/m.

When the heater 100 is used, a recording medium such as paper, a film, or cloth is disposed to be opposed to the first electrode 10 and the second electrode 20. Referring to FIG. 1, the recording medium is disposed substantially in parallel to the first electrode 10 and the second electrode 20 not to be in contact with the first electrode 10 and the second electrode 20 below the first electrode 10 and the second electrode 20, that is, in a negative direction of a Z-axis direction.

The distance between the end of the first electrode 10 and the recording medium is longer compared with the distance between the center of the first electrode 10 and the recording medium.

In this specification, the word "plan view" means "a plan view in a direction from positive to negative of a Z axis".

The center of the first electrode 10 indicates the part of a specific range expanding from the center of gravity of the first electrode 10 to the end (the contour) of the first electrode 10 in a plan view of the first electrode 10. In the plan view, the contour of the center of the first electrode 10 is a similar figure of the contour of the first electrode 10. It is assumed that, in the plan view, an intersection of a line segment connecting the center of gravity and the contour of the first electrode 10 and the contour of the center of the first electrode 10 is present in a position of 10% of the length of the line segment.

The distance between the end of the first electrode 10 and the recording medium indicates the distance in the Z-axis direction between the lower surface of the end of the first electrode 10 and the surface of the recording medium at the time when the recording medium is disposed with respect to the heater 100. Similarly, the distance between the center of the first electrode 10 and the recording medium indicates the distance in the Z-axis direction between the lower surface of the center of the first electrode 10 and the surface of the recording medium at the time when the recording medium is disposed with respect to the heater 100.

The first electrode 10 may have a substantially flat shape if the first electrode 10 has a shape in which the distance between the end of the first electrode 10 and the recording medium is longer compared with the distance between the center of the first electrode 10 and the recording medium. On the other hand, the second electrode 20 has a flat shape.

The shapes of the first electrode 10 and the second electrode 20 in the plan view are optional if the first electrode 10 has a shape in which the distance between the end of the first electrode 10 and the recording medium is longer compared with the distance between the center of the first electrode 10 and the recording medium. The shapes of the first electrode 10 and the second electrode 20 can be, for example, a square, a rectangle, a circle, and shapes obtained by combining the square, the rectangle, and the circle. In the example shown in FIG. 1, in the plan view, the second electrode 20 is disposed to surround the first electrode 10. Radiation of a distant electromagnetic field can be suppressed by disposing the second electrode 20 to surround the first electrode 10 in this way. Consequently, a level of an electromagnetic field to which an operator present around the drying device is exposed can be kept in a sufficiently safe level without providing an electromagnetic shield.

The shape of the first electrode 10 of the heater 100 is an elongated elliptical shape in the plan view. The shape of the second electrode 20 of the heater 100 is a hollowed elliptical shape. In the plan view, the second electrode 20 is disposed to surround the first electrode 10. The shape of the first electrode 10 is desirably a shape having fewer sharp corners. This is to prevent an electric field from concentrating on the corners of the first electrode 10 to induce corona discharge. Since the distance between the end of the first electrode 10 of the heater 100 and the recording medium is longer compared with the distance between the center of the first electrode 10 and the recording medium, corona discharge is prevented from being induced.

Further, although not illustrated, both of the first electrode 10 and the second electrode 20 may be formed in any shapes in the plan view and disposed to be adjacent to each other. In this case, the size in the plan view of the first electrode 10 and the second electrode 20 is 0.01 $cm^2$ or more and 100.0 $cm^2$ or less, preferably 0.1 $cm^2$ or more and 10.0 $cm^2$ or less, more preferably 0.5 $cm^2$ or more and 2.0 $cm^2$ or less, and still more preferably 0.5 $cm^2$ or more and 1.0 $cm^2$ or less as an area in the plan view of one electrode. The area described above is an area set when a frequency of 2.45 GHz is used. The area of the electrode increases when a frequency in use is reduced. The areas in the plan view of the first electrode 10 and the second electrode 20 may be the same or may be different.

In the heater 100, the high-frequency voltage and the reference potential are supplied to each of the elliptical first electrode 10 disposed in the center in the plan view and the hollowed-elliptical second electrode 20 surrounding the first electrode 10. The coil 30 is inserted between the first electrode 10 and the internal conductor 50 of the coaxial cable. The distance between the coil 30 and the first electrode 10 is preferably as short as possible.

The first electrode 10 and the second electrode 20 are preferably disposed not to overlap in the plan view. In the example shown in FIG. 1, the center bottom surface of the first electrode 10 and the bottom surface (the surface opposed to the recording medium) of the second electrode 20 are disposed on the same plane. By adopting such disposition, it is possible to efficiently radiate a predetermined electromagnetic wave to the recording medium.

The first electrode 10 and the second electrode 20 contain a material such as metal, an alloy, or a conductive oxide as a main component. The first electrode 10 and the second electrode 20 may be the same material or may be different materials. The first electrode 10 and the second electrode 20 may be configured as appropriate by selecting thickness and strength to enable the first electrode 10 and the second electrode 20 to support themselves. When it is difficult to maintain the strength, the first electrode 10 and the second electrode 20 can also be formed on the surface of a not-shown substrate or the like made of a material having a low dielectric loss tangent that transmits an electromagnetic wave. In the example shown in FIG. 1, the second electrode 20 is supported by a supporting member 40.

The intensity of an electromagnetic wave radiated from the heater 100 is extremely high in the vicinity of the first electrode 10 and the second electrode 20 and is extremely low in the distance from the first electrode 10 and the second electrode 20. In this specification, an electromagnetic field generated in the vicinity of the first electrode 10 and the second electrode 20 by the heater 100 is sometimes referred to as "near electromagnetic field". In this specification, an electromagnetic field generated by a general heater (aerial wire) for the purpose of transmitting an electromagnetic wave to the distance is sometimes referred to as "far electromagnetic field". A boundary between the vicinity and the distance is a position apart from the heater 100 by approximately ⅙ of a wavelength of the generated electromagnetic wave.

The heater 100 does not radiate the electromagnetic wave at an interval of m units. Electric field density of the electromagnetic wave attenuates to 30% or less of electric field density between the first electrode 10 and the second electrode 20 while the electromagnetic wave is transmitted in a distance of ⅙ of the wavelength of the electromagnetic wave. Therefore, unnecessary radiation less easily occurs in a region farther apart from the device than a distance as long as the wavelength of the generated electromagnetic wave.

When the drying device includes a plurality of heaters 100, for example, one power amplifier may be used for one heater 100. An output of the PLL circuit may be dividedly supplied to a plurality of power amplifiers to generate an electromagnetic wave for each of the heaters 100. When the drying device includes a plurality of pairs of the heaters 100 and the power amplifiers, it is possible to more easily individually control high-frequency outputs of the heaters 100.

1.1.2. Coil

The heater 100 includes the coil 30. The coil 30 is coupled in series to the first electrode 10 via an electric wire 55. The first electrode 10 is coupled to, via the coil 30, a path to which a high-frequency voltage is applied. One end of the coil 30 is electrically coupled to the first electrode 10. The other end of the coil 30 is electrically coupled in series to the high-frequency power supply. Heating energy efficiency of liquid is greatly different depending on a series insertion position of the coil 30 even if inductance is the same. It is desirable to set the coil 30 in a part as close as possible to the first electrode 10. The series insertion position is a position between the electric wire 55 and the first electrode 10 where the coil 30 is inserted by series coupling. That is, since a high voltage is generated at one end of the coil 30, a strong electric field is likely to be generated between the coil 30 and the first electrode 10 or between the electric wire 55 for coupling the coil 30 and the first electrode 10 and the second electrode 20. Since such an electric field cannot contribute to heating, the coil 30 and the first electrode 10 are preferably as close as possible.

Since the heater 100 includes the coil 30, it is possible to expect effects such as an effect of changing the impedance of the resonance circuit and matching the impedance of the resonance circuit and the impedance of the heater 100, an effect of increasing an electric field generated between the electrodes, and an effect of adding an electric field generated by the coil 30 to the electric field generated between the electrodes to intensify the electric field.

1.1.3. Curvature Radius of the End of the First Electrode

Like the heater 100 according to the first embodiment shown in FIG. 1, the first electrode 10 has a longitudinal direction (an X direction in the figure) and a latitudinal direction (a Y direction in the figure) in the plan view. When the first electrode 10 includes the longitudinal direction and the latitudinal direction in this way, a curvature radius of the end of the first electrode 10 in the longitudinal direction is preferably larger than a curvature radius of the end of the first electrode 10 in the latitudinal direction.

Figure 2:
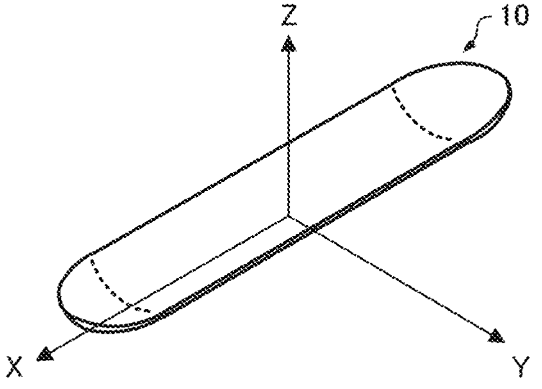
FIG. 2 is a perspective view schematically showing a first electrode of the heater according to the first embodiment.
Figure 3:
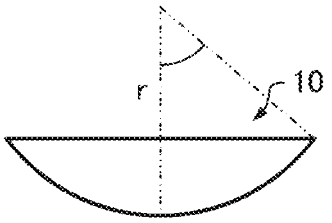
FIG. 3 is a schematic diagram of a cross section taken along a Y-Z plane of the first electrode of the heater according to the first embodiment.
Figure 4:
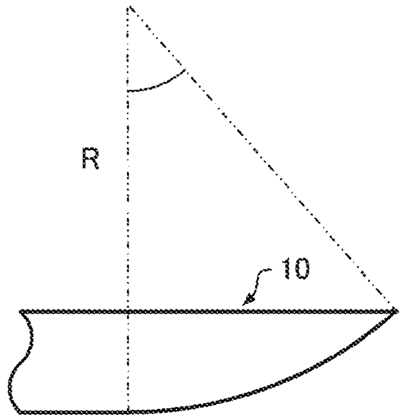
FIG. 4 is a schematic diagram of a part of a cross section taken along an X-Z plane of the first electrode of the heater according to the first embodiment.

FIG. 2 is an enlarged schematic diagram of the first electrode 10. FIG. 3 is a schematic diagram of a cross section taken along a Y-Z plane of the first electrode 10 shown in FIG. 2. FIG. 4 is a schematic diagram of a part of a cross section taken along an X-Z plane of the first electrode 10 shown in FIG. 2.

As shown in FIGS. 3 and 4, a curvature radius r of the end in the latitudinal direction of the first electrode 10 is smaller than a curvature radius R of the end in the longitudinal direction of the first electrode 10. Consequently, since the end in the longitudinal direction of the first electrode 10, on which the intensity of an electromagnetic field more easily concentrates when a high frequency wave is applied, is more gently away from the second electrode 20, an effect of relaxing the concentration of the intensity of the electromagnetic field becomes conspicuous. Consequently, heating unevenness on the recording medium opposed to the first electrode 10 and the second electrode 20 is much less easily caused.

1.2. Heater (Second Embodiment)

Figure 5:
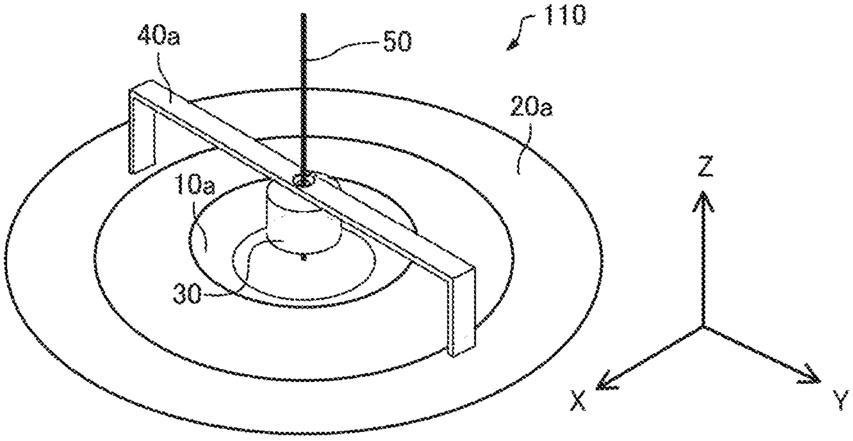
FIG. 5 is a perspective view schematically showing a heater according to a second embodiment.
Figure 6:
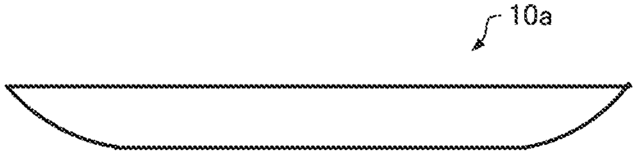
FIG. 6 is a schematic diagram of a cross section taken along a Y-Z plane of a first electrode of the heater according to the second embodiment.

FIG. 5 is a schematic diagram of a heater 110 according to a second embodiment. In the heater 110, a coil is not shown. FIG. 6 is a schematic diagram of a cross section taken along a Z-X plane of a first electrode 10*a* of the heater 110. The heater 110 according to the second embodiment includes the first electrode 10*a* and a second electrode 20*a*. The heater 110 according to the second embodiment has the same functions as the functions of the heater 100 according to the first embodiment except that the shapes of the first electrode 10*a*, the second electrode 20*a*, and a supporting member 40*a* of the heater 110 are different from the shapes of the first electrode 10, the second electrode 20, and the supporting member 40 of the heater 100 according to the first embodiment. The first electrode 10*a* is electrically coupled to a high-frequency power supply via the internal conductor 50 of the coaxial cable. The second electrode 20*a* is also electrically coupled to the high-frequency power supply via the supporting member 40*a*.

As shown in FIG. 6, in the heater 110 as well, the first electrode 10*a* has a shape in which the end of the first electrode 10*a* is away from a recording medium. That is, the distance between the end of the first electrode 10*a* and the recording medium is longer compared with the distance between the center of the first electrode 10*a* and the recording medium. In the heater 110, the first electrode 10*a* has a shape in which the end is away from the recording medium. The center has a flat shape. The second electrode 20*a* has a flat shape.

In the heater 110, the shapes of the first electrode 10*a* and the second electrode 20*a* in the plan view are circles. In the example shown in FIG. 5, in the plan view, the second electrode 20*a* having an annular shape is disposed to surround the circular first electrode 10*a* in the plan view. In the heater 110 as well, since the second electrode 20*a* surrounds the first electrode 10*a*, radiation of a far electromagnetic field is reduced. As the size of the electrode of the heater 110, it is preferable that the diameter of the first electrode 10*a* should be 1 cm or more and 10 cm or less, the outer diameter of the second electrode 20*a* should be 1 cm or more and 20 cm or less, and a gap between the first electrode 10*a* and the second electrode 20*a* should be approximately 1 cm or more and 5 cm or less.

1.3. Heater (Third Embodiment)

Figure 7:
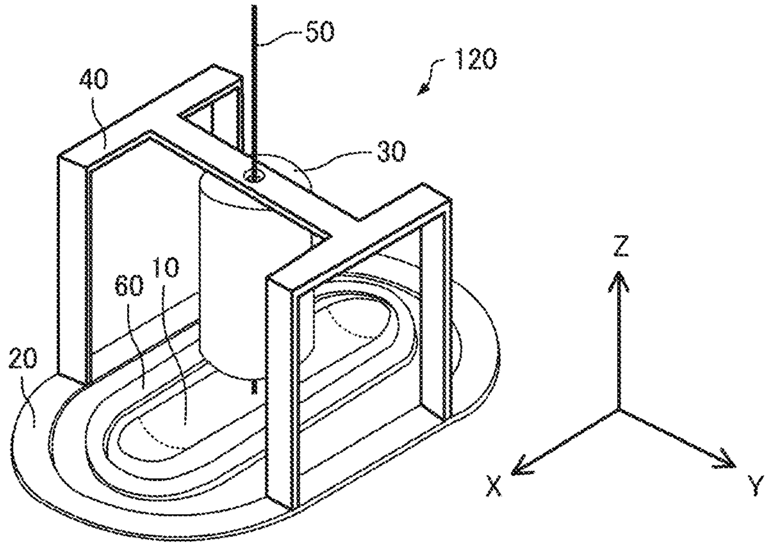
FIG. 7 is a perspective view schematically showing a heater according to a third embodiment.
Figure 8:
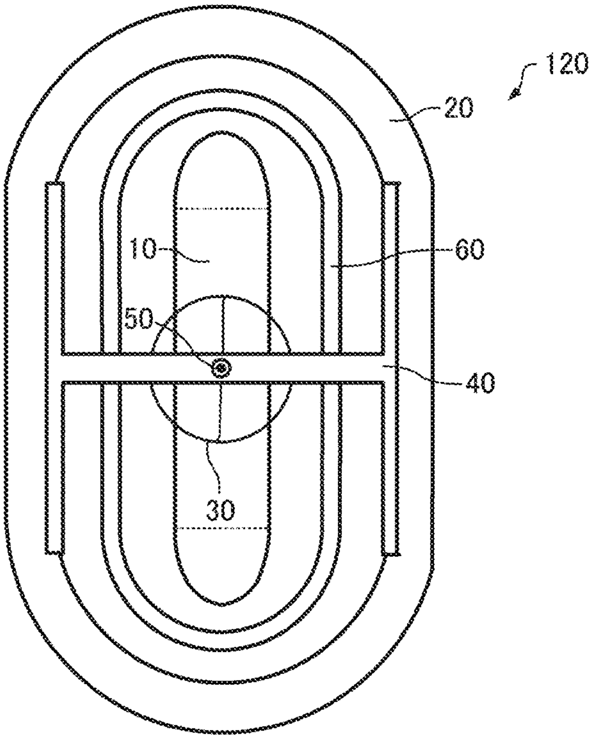
FIG. 8 is a plan view of the heater according to the third embodiment viewed from a direction along a Z axis.

FIG. 7 is a schematic diagram of a heater 120 according to a third embodiment. FIG. 8 is a schematic diagram in a plan view of the heater 120 according to the third embodiment. The heater 120 according to the third embodiment includes a floating electrode 60. The heater 120 is the same as the heater 100 according to the embodiment explained above except that that heater 120 includes the floating electrode 60. Therefore, the same members as the members of the heater 100 are denoted by the same reference numerals and signs and explanation of the members is omitted. In this specification, the floating electrode 60 is referred to as third electrode as well.

FIG. 7 shows an example of the floating electrode 60. The floating electrode 60 is disposed between the first electrode 10 having an elliptical shape and the second electrode 20 having an elliptically annular shape. The floating electrode 60 is not electrically coupled to the first electrode 10 and the second electrode 20 and is supported by a not-shown insulator. The shape of the floating electrode 60 is an elliptically annular shape.

The floating electrode 60 is not electrically coupled to a high-frequency power supply, a ground, a reference signal source, and the like and has independent potential. Since the floating electrode 60, which is a conductor, is disposed between the first electrode 10 and the second electrode 20, the intensity of an electromagnetic field generated between the first electrode 10 and the second electrode 20 is equalized on an X-Y plane. This is because an electric field between the electrodes is converted into an eddy current by the floating electrode 60. Consequently, it is possible to further reduce unevenness of the intensity of the electromagnetic field generated between the first electrode 10 and the second electrode 20.

1.4. Simulation

Figure 9:
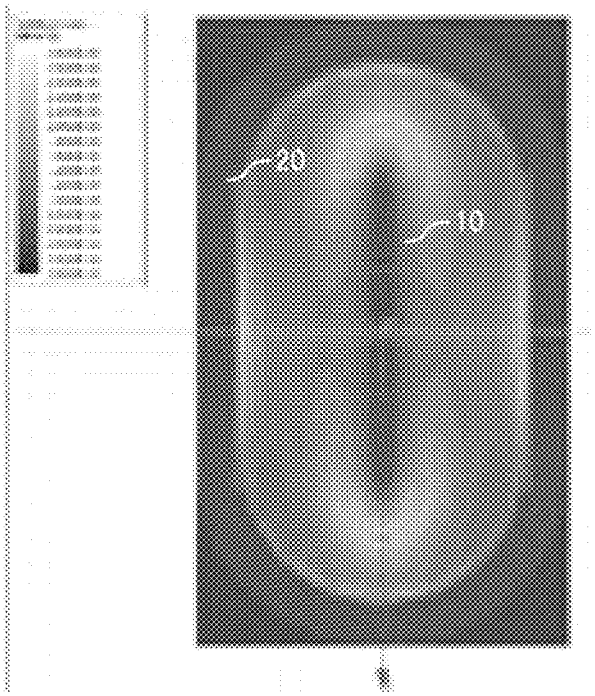
FIG. 9 is a simulation result of a heating amount distribution of the heater according to the first embodiment.
Figure 10:
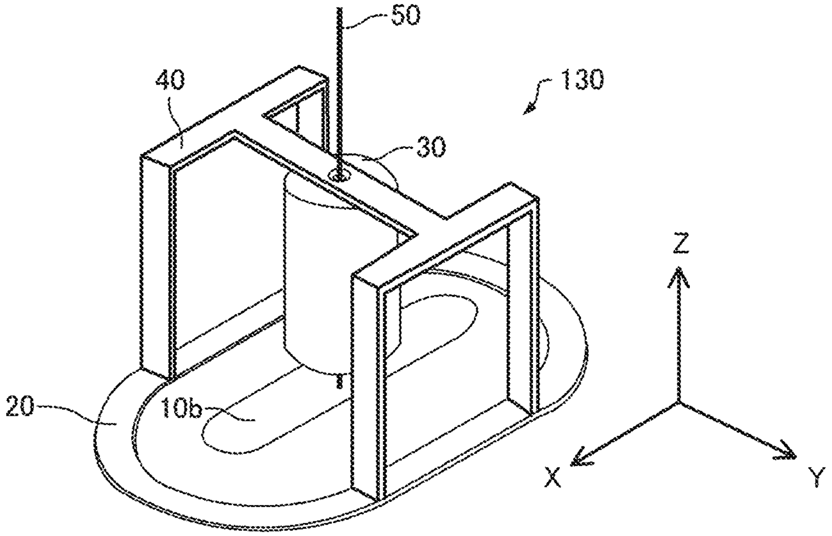
FIG. 10 is a perspective view schematically showing a heater according to a comparative example.
Figure 11:
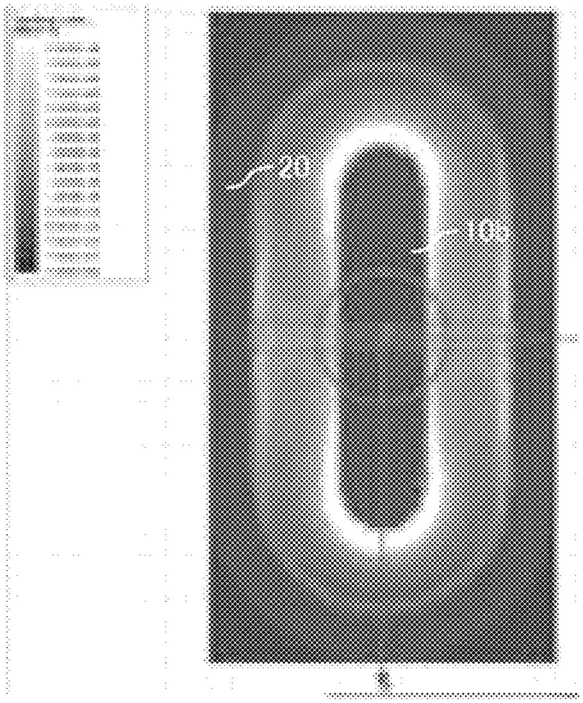
FIG. 11 is a simulation result of a heating amount distribution of the heater according to the comparative example.

FIG. 9 is a simulation result of a heating amount distribution of the heater 100 according to the first embodiment. FIG. 10 is a schematic diagram of a heater 130 according to a comparative example not having a shape in which the distance between the end of a first electrode 10*b* and the recording medium is longer compared with the distance between the center of the first electrode 10*b* and the recording medium. FIG. 11 is a simulation result of a heating amount distribution of the heater 130 according to the comparative example.

The heater 130 according to the comparative example shown in FIG. 10 includes the first electrode 10*b* and the second electrode 20. The heater 130 includes the same functions as the functions of the heater 100 according to the first embodiment except that the shape of the first electrode 10*b* is different from the shape of the first electrode 10 according to the first embodiment. The first electrode 10*b* is electrically coupled to the high-frequency power supply via the internal conductor 50 of the coaxial cable. The second electrode 20 is also electrically coupled to the high-frequency power supply.

As shown in FIG. 10, the heater 130 according to the comparative example does not have a shape in which the distance between the end of the first electrode 10*b* and the recording medium is longer compared with the distance between the center of the first electrode 10*b* and the recording medium. That is, the distance between the end of the first electrode 10*b* and the recording medium is the same as the distance between the center of the first electrode 10*b* and the recording medium.

FIG. 11 is a simulation result of a heating amount distribution of the heater 130 according to the comparative example in the plan view. As shown in FIG. 11, an elliptically annular region between the first electrode 10*b* and the second electrode 20 on the recording medium is heated by the heater 130. However, regions where a heating amount concentrates are found near the contour of the first electrode 10*b*. In such a case, it is seen that unevenness easily occurs in heating liquid on the recording medium. Heating regions are also present inside the contours of the first electrode 10*b* and the second electrode 20.

In contrast, when viewing the simulation result (FIG. 9) of the heating amount distribution of the heater 100 according to the first embodiment in the plan view, it is seen that the elliptically annular region between the first electrode 10 and the second electrode 20 on the recording medium is heated by the heater 100. However, it is seen that the concentration of the heating amount near the contour of the first electrode 10 is suppressed compared with the heater 130 according to the comparative example and the heating amount is averaged. In this way, it is seen that unevenness less easily occurs in heating the liquid on the recording medium because the heater 100 has the shape in which the distance between the end of the first electrode 10 and the recording medium is longer compared with the distance between the center of the first electrode 10 and the recording medium. In FIG. 9, heating regions are markedly found inside the contour of the first electrode 10 and more heating regions are found inside the contour of the second electrode 20 than in the heater 130. This is considered to be because the heater 100 according to the first embodiment has the shape in which the distance between the end of the first electrode 10 and the recording medium is longer compared with the distance between the center of the first electrode 10 and the recording medium.

Figure 12A:
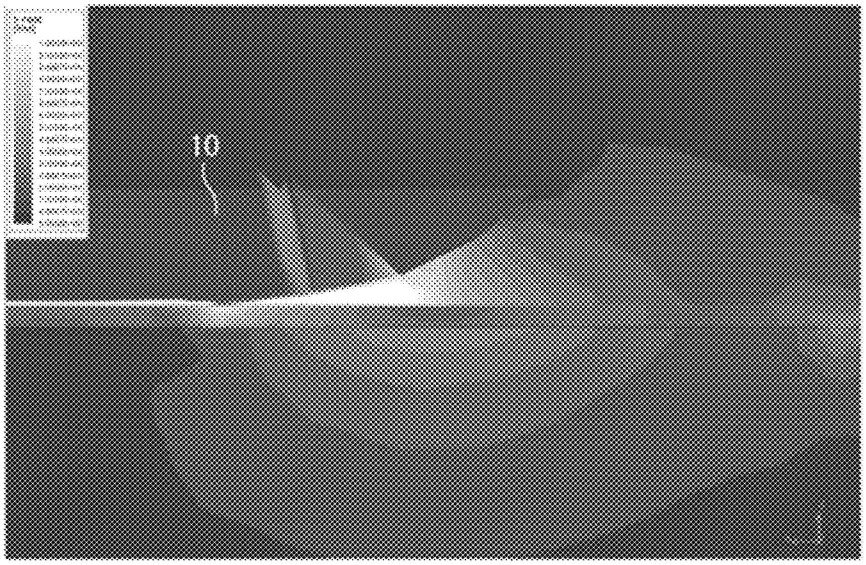
FIG. 12A is a simulation result of an electric field distribution of the heater according to the first embodiment.
Figure 12B:
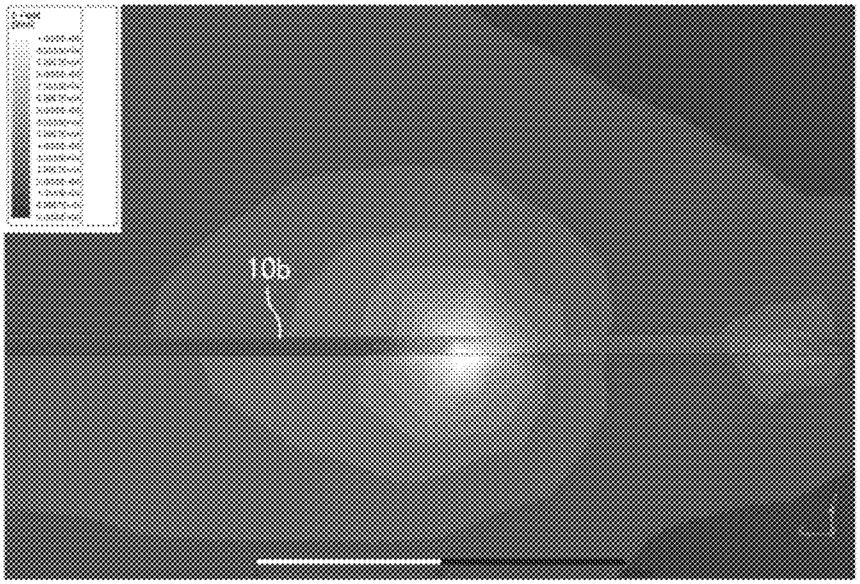
FIG. 12B is a simulation result of an electric field distribution of the heater according to the comparative example.

FIG. 12A is a simulation result of an electric field distribution of the first electrode 10 of the heater 100 according to the first embodiment. FIG. 12B is a simulation result of an electric field distribution of the first electrode 10*b* of the heater 130 according to the comparative example. FIGS. 12A and 12B are views from a side (a Y direction) and are enlarged views of the vicinities of the ends of the electrodes. It is seen from FIG. 12A that, in the heater 100 according to the first embodiment, an electric field expands around the end of the first electrode 10 and concentration of the electric field is relaxed. In contrast, in the heater 130 according to the comparative example, an electric field concentrates on the end of the first electrode 10*b*.

Figure 13A:
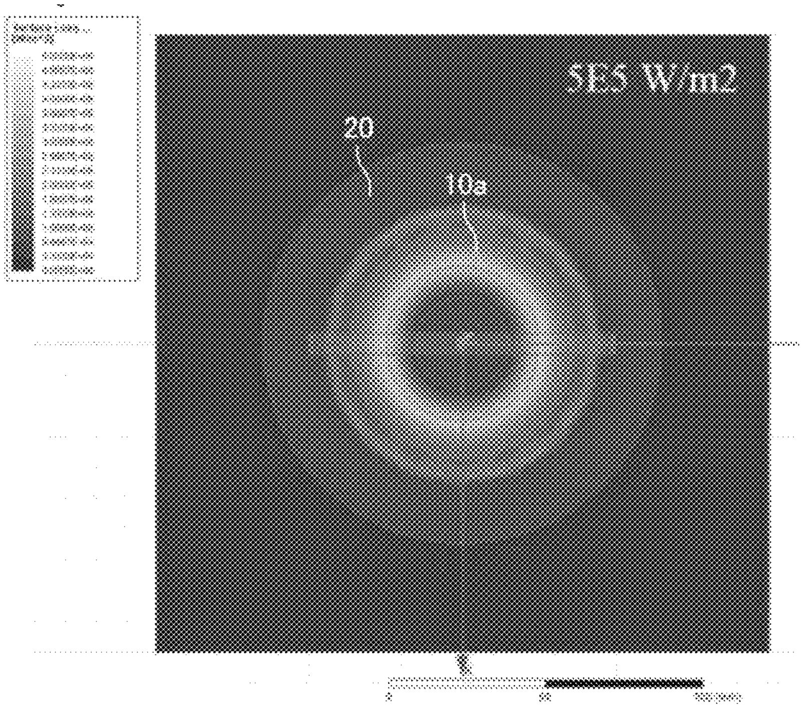
FIG. 13A is a simulation result of a consumed power distribution of the heater according to the second embodiment.
Figure 13B:
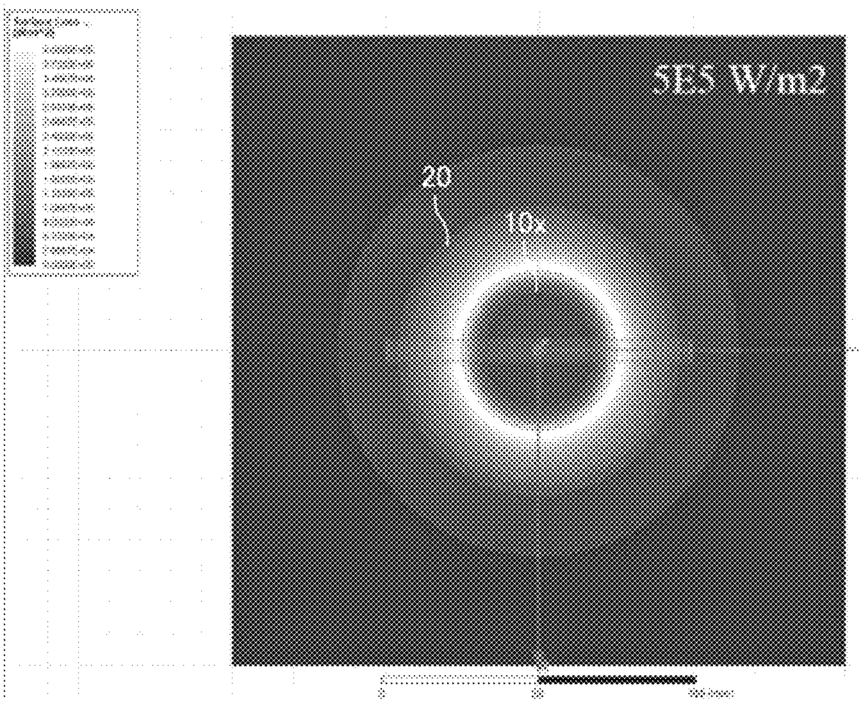
FIG. 13B is a simulation result of a consumed power distribution of the heater according to the comparative example.

FIG. 13A is a simulation result of a consumed power distribution of the first electrode 10*a* of the heater 110 according to the second embodiment. FIG. 13B is a simulation result of a consumed power distribution of the comparative example at the time when the first electrode 10*a* of the heater 110 according to the second embodiment is flat. In the heater according to the comparative example simulated in FIG. 13B, the distance between the end of the first electrode 10*a* and the recording medium is the same as the distance between the center of the first electrode 10*a* and the recording medium but is not shown. FIGS. 13A and 13B are shown in the plan view. In both of FIGS. 13A and 13B, it is seen that consumed power is generated in an annular region between the first electrode and the second electrode and the recording medium is heated. It is seen from FIG. 13A that the consumed power distribution expands to the inner side of the contour of the first electrode 10 and spatial concentration of the consumed power is relaxed. In contrast, it is seen from FIG. 13B that the consumed power concentrates on the end of the first electrode.

Figure 14:
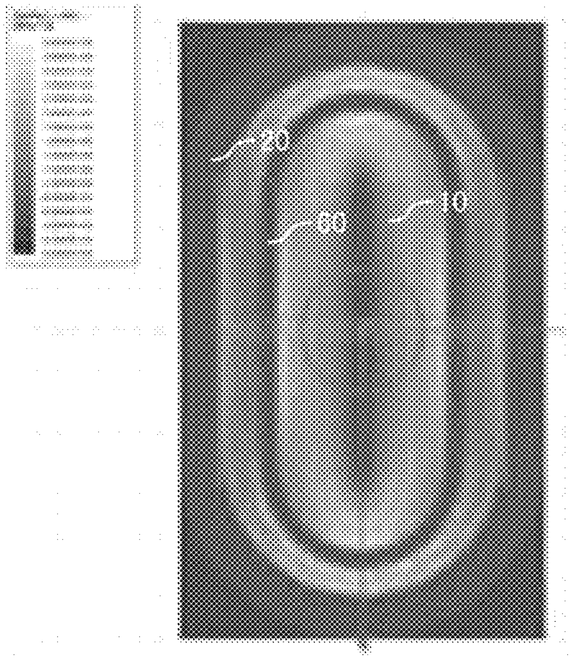
FIG. 14 is a simulation result of a heating amount distribution of the heater according to the third embodiment.

FIG. 14 is a simulation result of a heating amount distribution of the heater 120 according to the third embodiment. As shown in FIG. 14, the elliptically annular region between the first electrode 10 and the second electrode 20 on the recording medium is heated by the heater 120. However, a heating amount of a region corresponding to the floating electrode 60 is reduced. As a result, concentration of the heating amount is considered to be further relaxed.

1.5. Action Effects

With the drying device according to this embodiment, when a high frequency wave is applied, heating unevenness of liquid placed on the recording medium can be suppressed. That is, by setting the distance between the end of the first electrode of the heater included in the drying device and the recording medium longer compared with the distance between the center of the first electrode and the recording medium, it is possible to relax a strong electromagnetic field generated near the end of at least one electrode and disperse the electromagnetic field to a position apart from both the electrodes.

2. Recording Device

A recording device according to this embodiment includes a plurality of the drying devices according to the embodiment explained above. All of the plurality of drying devices are disposed to be separated from the recording medium at a predetermined interval. In the following explanation, an inkjet recording device 1000 is explained with reference to the drawings as an example of the recording device.

Figure 15:
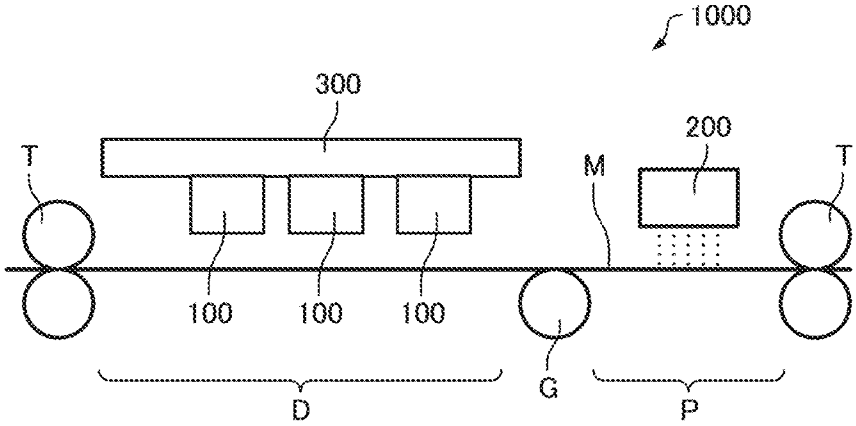
FIG. 15 is a schematic diagram of a main part of an example of a recording device according to an embodiment.

FIG. 15 is a schematic sectional view schematically showing a main part of the inkjet recording device 1000 according to the embodiment. The inkjet recording device 1000 includes an inkjet head 200 that applies an ink composition to a recording medium M, the heaters 100 of the plurality of drying devices, a moving mechanism 300 that moves the heaters 100 along the recording medium M, a conveying roller T, and a guide roller G.

Although not shown, the inkjet recording device 1000 includes a carriage that causes the inkjet head 200 to reciprocate in a direction crossing a conveying direction SS of the recording medium M and a control section that controls the entire device.

The inkjet head 200 is configured to eject a predetermined ink composition from nozzles and causes the ink composition to adhere to the recording medium M to thereby perform recording. In this embodiment, the inkjet head 200 is a serial-type inkjet head and performs scanning a plurality of times in a main scanning direction (a depth direction in FIG. 15) relatively to the recording medium M and applies the ink composition to the recording medium M. The inkjet head 200 is caused to perform scanning a plurality of times in the main scanning direction relatively to the recording medium M by an operation for moving the carriage in a medium width direction of the recording medium M. The medium width direction is the main scanning direction of the inkjet head 200. The scanning in the main scanning direction is referred to as main scanning as well.

The main scanning direction is a direction in which the carriage mounted with the inkjet head 200 moves. In FIG. 15, the main scanning direction is a direction crossing a sub-scanning direction, which is a conveying direction of the recording medium M. While the main scanning of the inkjet head 200 and sub-scanning, which is conveyance of the recording medium M, are repeatedly performed a plurality of times, ink is ejected from the inkjet head 200 at a predetermined timing and caused to adhere to a predetermined position of the recording medium M to perform recording on the recording medium M.

The predetermined ink composition or the like is supplied to the inkjet head 200 as appropriate by a cartridge or the like.

A system for ejecting ink droplets is not limited to an ejection system of the inkjet head 200. A publicly-known system in the past can be used. In this embodiment, a system for ejecting droplets using vibration of a piezoelectric element, that is, an ejection system for forming ink droplets with mechanical deformation of an electrostrictive element is used.

The inkjet recording device 1000 includes a recording region P where the ink composition is caused to adhere to the recording medium M by the inkjet head 200 and a drying region D where the recording medium M having passed through the recording region P is dried.

In the drying region D, a plurality of heaters 100 are disposed to be opposed to the recording medium M. The heaters 100 are mounted on the moving mechanism 300. The moving mechanism 300 can move the heaters 100 in any direction while maintaining the distance between the heaters 100 and the recording medium M. The heaters 100 may be disposed on an ink adhesion surface side of the recording medium M or may be disposed on the opposite side of the ink adhesion surface. Further, the heaters 100 may be respectively disposed on both the surface sides of the recording medium M.

In the drying region D, the ink composition adhering to the recording medium M is dried by the heaters 100 and a recorded object is formed. Since the inkjet recording device 1000 includes the heaters 100, it is possible to suppress heating unevenness of liquid such as ink adhering to the recording medium M.

Figure 16:
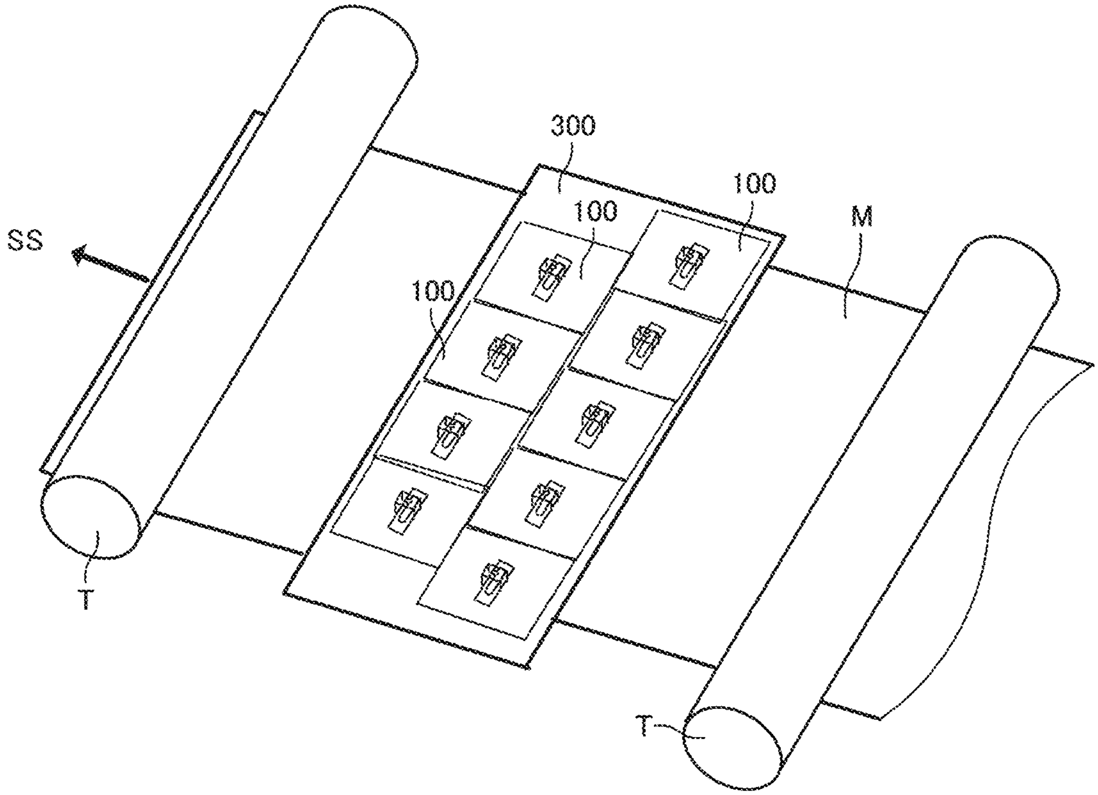
FIG. 16 is a perspective view schematically showing a drying region and the periphery of the drying region of the recording device according to the embodiment.
Figure 17:
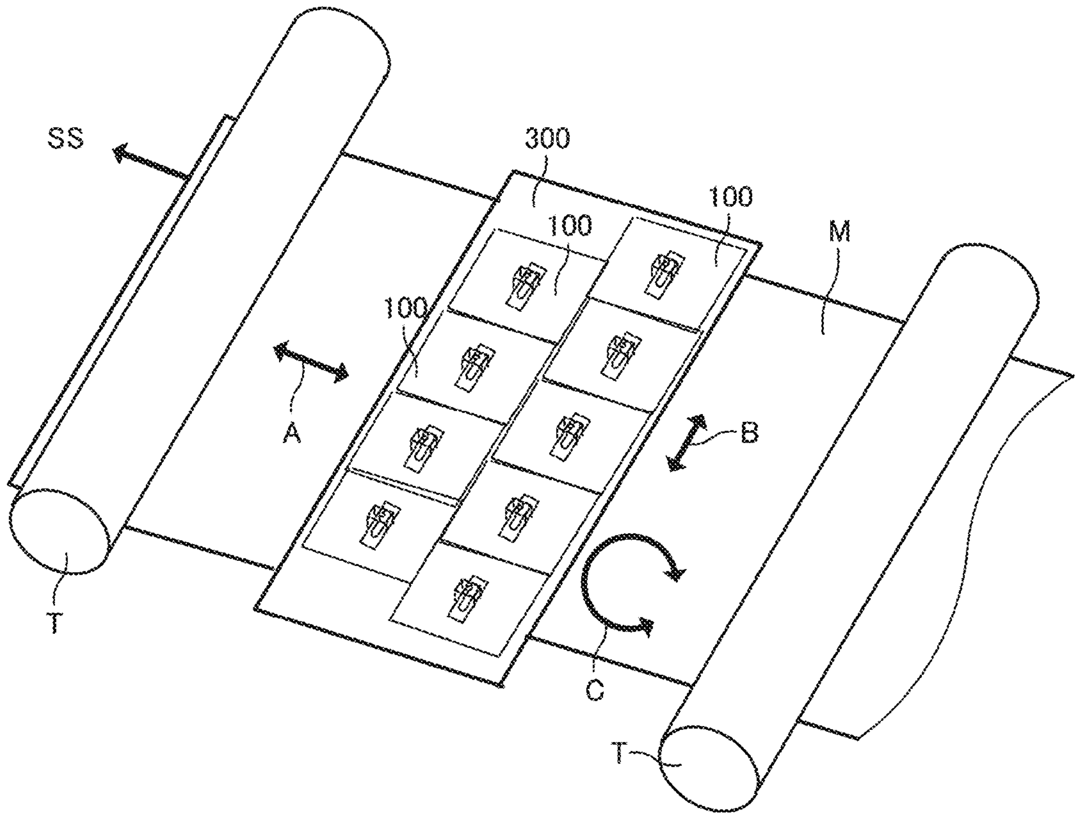
FIG. 17 is a perspective view schematically showing the drying region and the periphery of the drying region of the recording device according to the embodiment.

FIGS. 16 and 17 are schematic perspective views of the drying region D and the vicinity of the drying region D of the inkjet recording device 1000. In an example shown in FIGS. 16 and 17, nine heaters 100 are mounted on the moving mechanism 300. In the inkjet recording device 1000, as illustrated, when viewed along the conveying direction SS of the recording medium M, the heaters 100 are alternately disposed to prevent gaps from being easily formed. In the inkjet recording device 1000, heating unevenness caused by the individual heaters 100 is suppressed. However, portions among the heaters 100 disposed side by side are sometimes less easily heated. Therefore, in the inkjet recording device 1000, the plurality of heaters 100 are disposed such that the portions less easily heated are not easily formed in the width direction when the recording medium M is conveyed.

3. Swinging of the Drying Device

In the inkjet recording device 1000, by driving the moving mechanism 300, the heaters 100 may be swung in a state in which a predetermined interval is kept between the heaters 100 and the recording medium M. Examples of a form of the swinging of the heaters 100 include a form of reciprocating along the conveying direction SS of the recording medium M (schematically indicated by an "A" arrow in FIG. 17), a form of reciprocating along a direction crossing the conveying direction SS of the recording medium M (schematically indicated by a "B" arrow in FIG. 17), and a form of performing a circular motion clockwise or counterclockwise (schematically indicated by a "C" arrow in FIG. 17). These forms of movement can be combined. Movement amounts of the forms of movement are optional.

Since the heaters 100 are swung in the state in which the predetermined interval is kept between the heaters 100 and the recording medium M, it is possible to further suppress the heating unevenness that occurs in the portions among the heaters 100 disposed side by side. Since the inkjet recording device 1000 is the serial-type printer as explained above, the recording medium M is intermittently conveyed. Therefore, the recording medium M sometimes stands still in the drying region. In such a case, even in a state in which the recording medium M is standing still, the heaters 100 swing, whereby the heating unevenness on the recording medium M can be reduced.

A moving distance in which the moving mechanism 300 causes the plurality of heaters 100 to reciprocate is preferably equal to a conveying distance in which the recording medium M is conveyed at a time in the conveying direction SS. For example, when the inkjet head 200 is mounted on the carriage, the inkjet head 200 reciprocates in the width direction of the recording medium M, whereby a printing pattern is drawn. Therefore, if the heaters 100 are not caused to reciprocate, it is likely that a region where a time in which the recording medium M stays right under the heaters 100 is long and a region where the time in which the recording medium M stays right under the heaters 100 is short occur for each region of the recording medium M according to a conveyance amount of the recording medium M, leading to heating unevenness. By equalizing the moving distance in which the moving mechanism 300 causes the plurality of heaters 100 reciprocate with the moving distance in which the recording medium M is conveyed at a time, the time in which the recording medium M stays right under the heaters 100 equalizes for each region of the recording medium M and heating unevenness can be suppressed.

In the above explanation, it is assumed that the inkjet recording device 1000 is the serial-type printer. However, the inkjet recording device may be a line-type printer. In that case as well, it is possible to easily obtain a recorded object with heating unevenness reduced.

The embodiments and the modified embodiments explained above are examples and are not limited to these examples. For example, the embodiments and the modified embodiments can also be combined as appropriate.

The present disclosure includes substantially the same configurations as the configurations explained in the embodiments, for example, configurations having the same functions, the same methods, and the same results or configurations having the same objects and the same effects. The present disclosure includes configurations in which nonessential portions of the configurations explained in the embodiments are substituted. The present disclosure includes configurations that can achieve the same action effects as the action effects of the configurations explained in the embodiments or configurations that can achieve the same objects as the objects of the configurations explained in the embodiments. The present disclosure includes configurations obtained by adding publicly-known techniques to the configurations explained in the embodiments.

The following contents are derived from the contents explained above.

A drying device according to an aspect is a drying device disposed at a predetermined interval from a recording medium and including a heater configured to dry liquid applied to the recording medium with a high frequency wave. The heater includes: a first electrode coupled to a power supply that outputs the high frequency wave; and a second electrode coupled to the power supply that outputs the high frequency wave and disposed to be separated from the first electrode at a predetermined interval. A distance between an end of the first electrode and the recording medium is longer compared with a distance between a center of the first electrode and the recording medium.

With the drying device, when the high frequency wave is applied, the liquid on the recording medium can be uniformly heated. That is, by setting the distance between the end of the first electrode and the recording medium longer compared with the distance between the center of the first electrode and the recording medium, it is possible to relax a strong electromagnetic field generated near the end of at least one electrode and disperse the electromagnetic field to a position apart from both the electrodes. Consequently, it is possible to prevent heating unevenness on the recording medium opposed to one drying device from easily occurring.

In the drying device, when viewed from a normal direction of the recording medium, the first electrode may have a longitudinal direction and a latitudinal direction, and a curvature radius of an end of the first electrode in the longitudinal direction may be larger than a curvature radius of an end of the first electrode in the latitudinal direction.

With the drying device, since the end in the longitudinal direction of the first electrode, on which the intensity of an electromagnetic field more easily concentrates when a high frequency wave is applied, is more gently away from the second electrode, an effect of relaxing the concentration of the intensity of the electromagnetic field becomes conspicuous. Consequently, heating unevenness on the recording medium opposed to one drying device can be much less easily caused.

In the drying device, the heater may include a third electrode between the first electrode and the second electrode, and the third electrode may not be coupled to the power supply.

With the drying device, it is possible to further reduce unevenness of the intensity of an electromagnetic field generated between the first electrode and the second electrode.

A recording device includes a plurality of the drying devices. The plurality of drying devices may be disposed side by side in a direction crossing a conveying direction of the recording medium.

With the recording device, it is possible to uniformly dry liquid such as ink adhering to the recording medium.

In the recording device, the drying device may swing in a state in which the predetermined interval between the drying device and the recording medium is kept.

With the recording device, it is possible to further reduce heating unevenness of the liquid on the recording medium. That is, the plurality of drying devices swing, whereby it is possible to reduce heating unevenness between a region heated by one drying device and a region less easily heated present between drying devices adjacent to each other.

In the recording device, the recording device may be a serial-type inkjet recording device.

With the recording device, even in a state in which conveyance of the recording medium is intermittent and the recording medium is standing still, a drying device swings, whereby it is possible to reduce heating unevenness on the recording medium.

What is claimed is:

1. A drying device disposed at a predetermined interval from a recording medium and including a heater configured to dry liquid applied to the recording medium with a high frequency wave, wherein the heater includes:

a first electrode coupled to a power supply that outputs the high frequency wave; and a second electrode coupled to the power supply that outputs the high frequency wave and disposed to be separated from the first electrode at a predetermined interval, the second electrode, when viewed from a normal direction of the recording medium, surrounds the first electrode and has a hollowed elliptical shape, the second electrode being configured to prevent induction of a corona discharge, and a distance between an end of the first electrode and the recording medium is longer compared with a distance between a center of the first electrode and the recording medium.

2. The drying device according to claim 1, wherein when viewed from a normal direction of the recording medium, the first electrode has a longitudinal direction and a latitudinal direction, and a curvature radius of an end of the first electrode in the longitudinal direction is larger than a curvature radius of an end of the first electrode in the latitudinal direction.

3. The drying device according to claim 1, wherein the heater includes a third electrode between the first electrode and the second electrode, and the third electrode is not coupled to the power supply.

4. A recording device comprising a plurality of the drying devices according to claim 1, wherein the plurality of drying devices are disposed side by side in a direction crossing a conveying direction of the recording medium.

5. The recording device according to claim 4, wherein the drying device swings in a state in which the predetermined interval between the drying device and the recording medium is kept.

6. The recording device according to claim 5, wherein the recording device is a serial-type inkjet recording device.

* * * * *